(12) United States Patent
Yasunaga

(10) Patent No.: US 11,214,097 B2
(45) Date of Patent: Jan. 4, 2022

(54) PNEUMATIC TIRE

(71) Applicant: Toyo Tire & Rubber Co., Ltd., Itami (JP)

(72) Inventor: Toshikazu Yasunaga, Itami (JP)

(73) Assignee: TOYO TIRE CORPORATION, Itami (JP)

( * ) Notice: Subject to any disclaimer, the term of this patent is extended or adjusted under 35 U.S.C. 154(b) by 403 days.

(21) Appl. No.: 16/211,846

(22) Filed: Dec. 6, 2018

(65) Prior Publication Data

US 2019/0176526 A1    Jun. 13, 2019

(30) Foreign Application Priority Data

Dec. 13, 2017  (JP) .............................. JP2017-238878

(51) Int. Cl.
*B60C 11/12* (2006.01)
*B60C 11/03* (2006.01)
*B60C 11/13* (2006.01)

(52) U.S. Cl.
CPC ...... *B60C 11/0302* (2013.01); *B60C 11/0306* (2013.01); *B60C 11/1204* (2013.01); *B60C 11/1236* (2013.01); *B60C 2011/1209* (2013.01); *B60C 2011/1213* (2013.01); *B60C 2011/1227* (2013.01); *B60C 2011/1254* (2013.01); *B60C 2011/133* (2013.01)

(58) Field of Classification Search
CPC ............. B60C 11/1236; B60C 11/0302; B60C 2011/1213; B60C 2011/1227; B60C 2011/1209; B60C 2011/133
See application file for complete search history.

(56) References Cited

U.S. PATENT DOCUMENTS

| | | | |
|---|---|---|---|
| 5,209,793 A * | 5/1993 | Cusimano, II | ...... B60C 11/0306 152/209.2 |
| 5,301,727 A | 4/1994 | Inoue | |
| 2004/0238092 A1* | 12/2004 | Colombo | .............. B60C 11/032 152/209.15 |

(Continued)

FOREIGN PATENT DOCUMENTS

| CN | 304072140 S | 3/2017 |
|---|---|---|
| EP | 3 375 629 A1 | 9/2018 |

(Continued)

OTHER PUBLICATIONS

Machine translation for Japan 2011-088489 (Year: 2021).*

(Continued)

*Primary Examiner* — Steven D Maki
(74) *Attorney, Agent, or Firm* — Westerman, Hattori, Daniels & Adrian, LLP

(57) ABSTRACT

To obtain a uniform ground contact pressure distribution in a pneumatic tire in which an edge portion of a land portion is provided with a notch portion. In a pneumatic tire according to an embodiment, an edge portion of a land portion formed in a tread portion is provided with a notch portion having a triangular shape in the plan view. A wavy sipe is provided to extend from an apex corner portion of the notch portion into the land portion and a straight sipe is provided adjacent to the wavy sipe with a gap interposed therebetween to extend into the land portion and to open to the edge portion of the land portion.

2 Claims, 3 Drawing Sheets

(56) References Cited

U.S. PATENT DOCUMENTS

2015/0202928 A1  7/2015  Akashi et al.

FOREIGN PATENT DOCUMENTS

| | | | |
|---|---|---|---|
| EP | 3375638 A1 | | 9/2018 |
| JP | H03-25007 A | | 2/1991 |
| JP | H10-114205 A | | 5/1998 |
| JP | 2000-233611 A | | 8/2000 |
| JP | 2003-226116 A | | 8/2003 |
| JP | 2006-35933 A | | 2/2006 |
| JP | 2007-030686 A | * | 2/2007 |
| JP | 2007-30686 A | | 2/2007 |
| JP | 2009-120055 A | | 6/2009 |
| JP | 2010-23586 A | | 2/2010 |
| JP | 2010-274695 A | | 12/2010 |
| JP | 2011-991 A | | 1/2011 |
| JP | 2011-088489 A | * | 5/2011 |
| JP | 2011-218830 A | | 11/2011 |
| JP | 2011-218831 A | | 11/2011 |
| JP | 2015-209169 A | | 11/2015 |
| JP | 1558696 S | * | 9/2016 |
| KR | 2003-0089279 A | * | 11/2002 |
| WO | 2017/082406 A1 | | 5/2017 |

OTHER PUBLICATIONS

Machine translation for Japan 2007-030686 (Year: 2021).*
Machine translation for Japan 1558696 S (Year: 2021).*
Machine translation for Korea 2003-0089279 (Year: 2021).*
Derwent abstract for Korea 2003-0089279 (Year: 2021).*
Office Action dated Jun. 30, 2020, issued in counterpart CN Application No. 201811387918.0 with English translation. (11 pages).
Office Action dated Jan. 25, 2021, issued in counterpart CN Application No. 201811387918.0, with English Translation. (10 pages).
Office Action dated Sep. 21, 2021, issued in counterpart JP Application No. 2017-238878, with English translation. (6 pages).

* cited by examiner

PNEUMATIC TIRE

CROSS-REFERENCE TO RELATED APPLICATIONS

This application is based upon and claims the benefit of priority from the prior Japanese Patent Application No. 2017-238878, filed on Dec. 13, 2017; the entire contents of which are incorporated herein by reference.

BACKGROUND

1. Technical Field

An embodiment of the present invention relates to a pneumatic tire.

2. Description of the Related Art

Conventionally, there is known a technique in which a plurality of sipes are provided in a land portion formed in a tread portion to increase an edge component by the sipes for the purpose of improving performance of a pneumatic tire on icy and snowy roads.

As the sipe, there are proposed various sipes including a straight sipe having a straight cross-sectional shape or a wavy sipe having a wavy cross-sectional shape (see JP-A-2006-035933, JP-A-2000-233611, JP-A-2010-023586, JP-A-2011-000991 and JP-A-2011-218830). Further, as described in JP-A-2007-030686, a zigzag-shaped sipe which extends in a tire circumferential direction using a tire width direction as an amplitude direction is also known.

SUMMARY

Incidentally, there is a case in which a notch portion is provided in the edge portion of the land portion in order to increase an edge component. When the sipe extending from an apex corner portion of the notch portion into the land portion is formed as a straight sipe at the time of combining the notch portion with the sipe, deterioration in rigidity at that portion is large and a ground contact pressure distribution becomes non-uniform. As a result, it is difficult to sufficiently exhibit performance such as traction performance, uneven wear resistance, and performance on ice.

An object of an embodiment of the invention is to obtain a uniform ground contact pressure distribution in a pneumatic tire including a notch portion provided in an edge portion of a land portion.

A pneumatic tire according to an embodiment of the invention is a pneumatic tire including: a land portion which is formed in a tread portion; a notch portion which is provided in an edge portion of the land portion and is formed in a triangular shape in the plan view; a wavy sipe which extends from an apex corner portion of the notch portion into the land portion; and a straight sipe which is provided adjacent to the wavy sipe with a gap interposed therebetween to extend into the land portion and to open to the edge portion of the land portion.

According to the embodiment, it is possible to obtain a uniform ground contact pressure distribution in a pneumatic tire in which an edge portion of a land portion is provided with a notch portion and a sipe.

DETAILED DESCRIPTION

Figure 1:
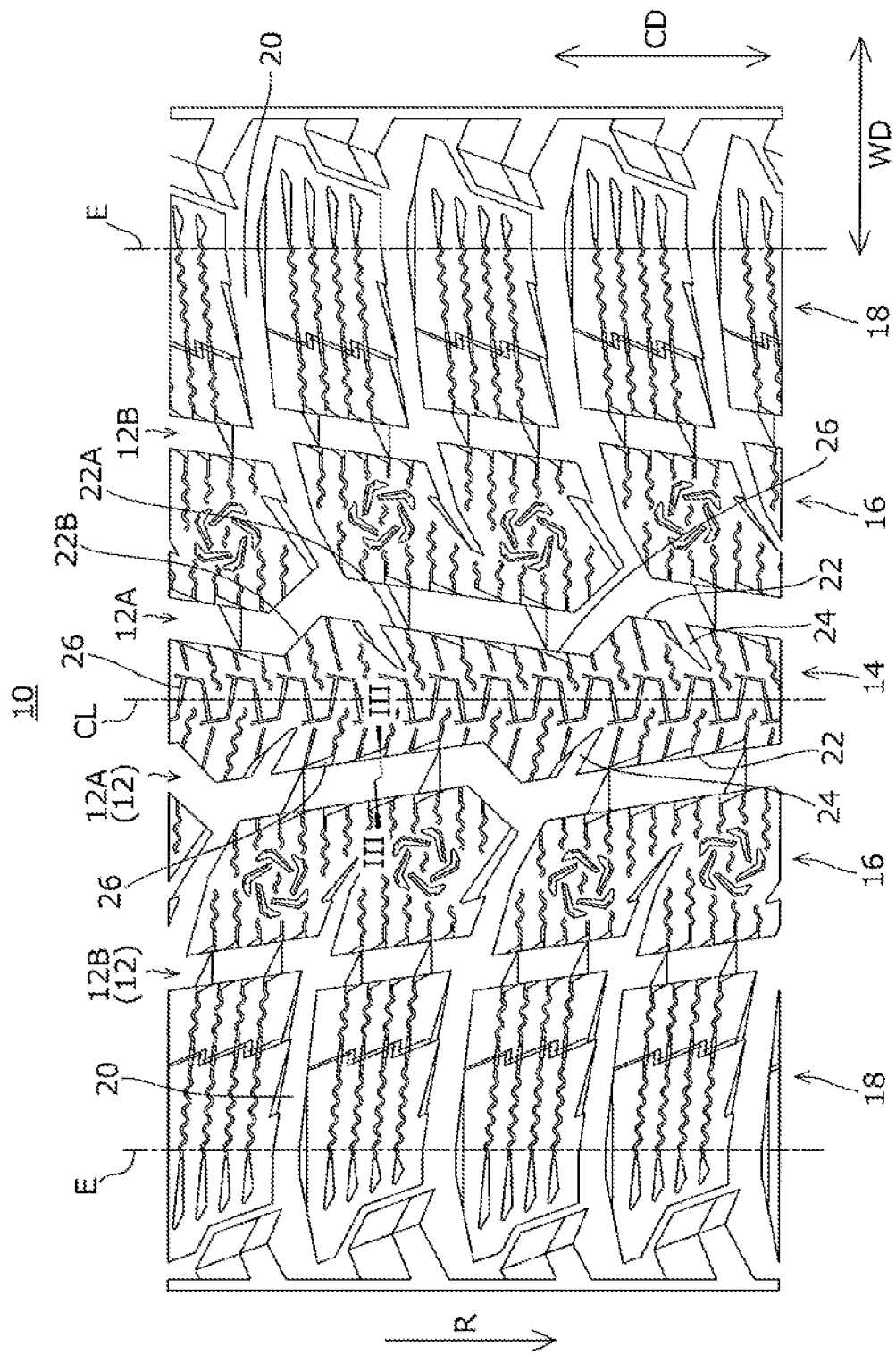
FIG. 1 is a developed view illustrating a tread pattern of a pneumatic tire according to an embodiment.

Hereinafter, an embodiment will be described with reference to the drawings.

Although not illustrated in the drawings, a pneumatic tire according to an embodiment includes a pair of right and left bead portions, a pair of right and left sidewall portions, and a tread portion provided between both sidewall portions to connect outer end portions of the right and left sidewall portions in the radial direction and a general tire structure can be used for a structure other than a tread pattern.

As illustrated in FIG. 1, a tread rubber surface of a tread portion 10 is provided with a plurality of main grooves 12 which extend in a tire circumferential direction CD and in this example, four main grooves are formed at intervals in a tire width direction WD. That is, a pair of center main grooves 12A and 12A is provided at both sides of a tire equator CL and a pair of shoulder main grooves 12B and 12B is disposed at the outside thereof. Four main grooves 12 are zigzag-shaped grooves which are bent with an amplitude in the tire width direction WD and extend in the tire circumferential direction CD. Furthermore, in FIG. 1, Reference Sign E indicates a tire ground contact end.

The pneumatic tire is a tire having a specified rotation direction and in the drawings, the rotation direction is indicated by Reference Sign R. The pneumatic tire is attached to a vehicle so that the tire rotates in a direction indicated by the arrow R when the vehicle runs forward. As a mark for this purpose, a display for designating the rotation direction is provided on, for example, the sidewall portion or the like of the pneumatic tire.

In the tread portion 10, a plurality of land portions are divided by the main groove 12 in the tire width direction WD. Specifically, a center land portion 14 interposed between the pair of center main grooves 12A and 12A, a pair of right and left intermediate land portions 16 and 16 interposed between the center main groove 12A and the shoulder main groove 12B, and a pair of right and left shoulder land portions 18 and 18 located at the outside of the shoulder main groove 12B in the tire width direction are provided. The intermediate land portion 16 and the shoulder land portion 18 are formed as a block row in which a plurality of blocks are arranged in the tire circumferential direction CD in such a manner that a plurality of lateral grooves 20 are provided at intervals in the tire circumferential direction CD. Meanwhile, the center land portion 14 is not divided by the lateral groove and is formed as a rib which is continuous in the entire circumference of the tire circumferential direction CD.

The embodiment has a characteristic in the configuration of the center land portion 14 and the configuration of the center land portion 14 will be described in detail below with reference to FIGS. 1 to 3.

The center land portion 14 is a rib which extends on the tire equator CL in the tire circumferential direction CD and right and left edge portions 22 of the center land portion 14 are formed in a zigzag shape by the zigzag-shaped center main grooves 12A and 12A at both sides. Further, in the center land portion 14, lateral grooves 24 not penetrating the center land portion 14 are alternately provided on the right and left sides at intervals in the tire circumferential direction CD. The lateral groove 24 is formed as a leading end portion of the lateral groove 20 on the extension line of the lateral groove 20 crossing the intermediate land portion 16 and the shoulder land portion 18.

The edge portion 22 of the center land portion 14 is provided with a notch portion 26 having a triangular shape in the plan view. The notch portion 26 is provided in the edge portion 22 extending in the tire circumferential direction CD to be arranged at intervals in the tire circumferential direction CD. In this example, in the zigzag-shaped edge portion 22 in which a long edge portion 22A and a short edge portion 22B corresponding to two types of edge portions having different lengths are alternately arranged, three notch portions 26 are arranged in each long edge portion 22A. The notch portion 26 is provided at each of both edge portions 22 at the right and left sides of the center land portion 14.

Figure 2:
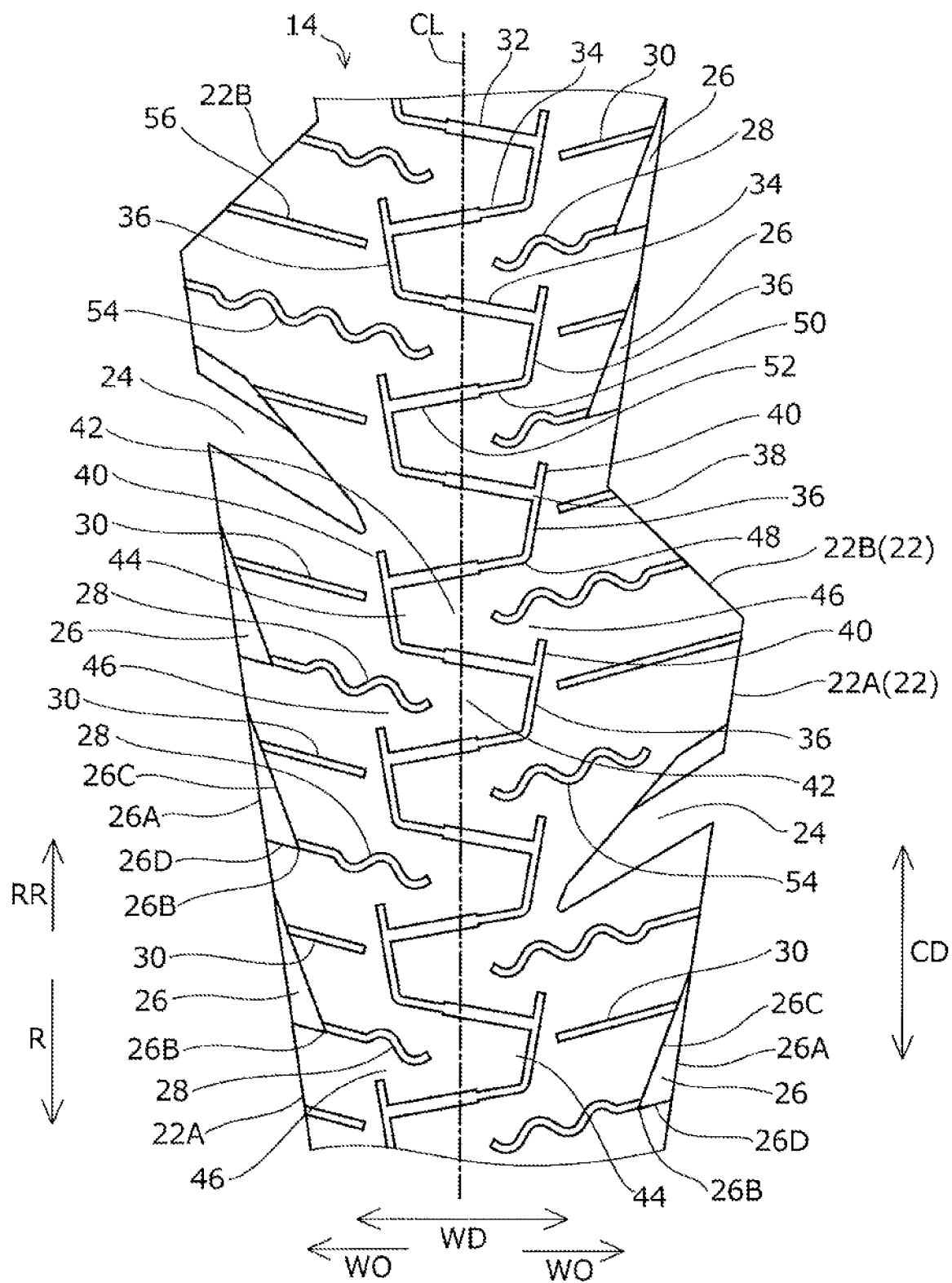
FIG. 2 is an enlarged view of a main part of the tread pattern.

In the plan view illustrated in FIG. 2, the notch portion 26 is formed in a triangular shape in which a position near the edge portion 22 is set as a bottom edge 26A and a front end of a notch formed in a V-shape inside the center land portion 14 is set as an apex corner portion 26B and is formed in a flat triangular shape in which an inclined edge portion 26C forming an acute angle with the bottom edge 26A in both edges forming the apex corner portion 26B is sufficiently longer than the other edge 26D. In this example, an obtuse triangular shape is formed such that the apex corner portion 26B has an acute angle and an angle formed by the edge 26D and the bottom edge 26A is an obtuse angle.

Figure 3:
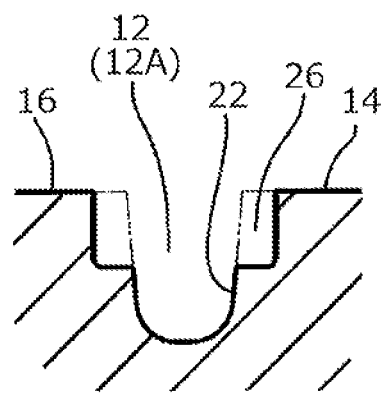
FIG. 3 is a cross-sectional view taken along a line III-III of FIG. 1.

As illustrated in FIG. 3, in this example, the notch portion 26 is not formed in the entire edge portion 22 of the center land portion 14 in the height direction and is formed at a height which is substantially half the depth of the main groove 12 from the tread surface. That is, the notch portion 26 is formed to be stepped down to the center portion in the height direction of the side wall facing the main groove 12 of the center land portion 14.

As illustrated in FIG. 2, the center land portion 14 is provided with a wavy sipe 28 extending from the apex corner portion 26B of the notch portion 26 into the center land portion 14. The wavy sipe 28 is a sipe having a wavy cross-sectional shape and may partially have a straight portion as long as the sipe is mainly formed in a wavy shape. Here, the wavy shape is not limited to a curved wavy shape and also includes a zigzag shape.

In the wavy sipe 28, one end in the extension direction opens to the main groove 12 at the apex corner portion 26B, that is, the wavy sipe 28 communicates with the notch portion 26. Then, the wavy sipe 28 extends from the apex corner portion 26B in the tire width direction WD and is terminated inside the center land portion 14. The wavy sipe 28 is not limited to a wavy sipe extending in parallel to the tire width direction WD and may obliquely extend as long as the wavy sipe extends in the tire width direction WD.

The center land portion 14 is provided with a straight sipe 30 which is provided adjacent to the wavy sipe 28 with a gap interposed therebetween to extend into the center land portion 14 and to open to the edge portion 22 of the center land portion 14. The straight sipe 30 is a sipe having a straight cross-sectional shape.

The straight sipe 30 is a sipe which extends in parallel to the wavy sipe 28 and one end in the extension direction opens to the inclined edge portion 26C of the notch portion 26. Then, the straight sipe 30 extends from the inclined edge portion 26C in the tire width direction WD and is terminated inside the center land portion 14. The straight sipe 30 is not limited to a straight sipe extending in parallel to the tire width direction WD and may obliquely extend as long as the straight sipe extends in the tire width direction WD.

The wavy sipe 28 and the straight sipe 30 are alternately provided in the tire circumferential direction CD, so that the sipe interposed between two wavy sipes 28 and 28 becomes the straight sipe 30.

The groove widths of the wavy sipe 28 and the straight sipe 30 are not particularly limited and may be, for example, 0.1 to 1.0 mm, 0.2 to 0.8 mm, or 0.3 to 0.6 mm. The groove depths of the wavy sipe 28 and the straight sipe 30 are not particularly limited and may be, for example, 30 to 80% of the main groove depth.

The center portion of the center land portion 14 is provided with a zigzag-shaped sipe 32 which continuously extends in the tire circumferential direction CD. The zigzag-shaped sipe 32 extends, in this example, in the entire circumference in the tire circumferential direction CD on the tire equator CL. The zigzag-shaped sipe 32 is a sipe which does not open to the main groove 12 and is a wavy sipe in which the tire width direction WD is substantially the same as the amplitude direction. The zigzag-shaped sipe 32 extends in the tire circumferential direction CD while alternately swinging to the right and left sides of the tire width direction WD at a predetermined amplitude.

The zigzag-shaped sipe 32 has a zigzag-shaped (that is, winding-shaped) cross-section by a plurality of lateral sipe portions 34 arranged at intervals in the tire circumferential direction CD and a plurality of longitudinal sipe portions 36 alternately connecting the end portions of the lateral sipe portions 34 at the right and left sides.

The lateral sipe portion 34 is a sipe which extends in the tire width direction WD. In this example, the lateral sipe portion has a straight cross-sectional shape and is inclined with respect to the tire width direction WD. In this example, the lateral sipe portions 34 and 34 which are adjacent to each other in the tire circumferential direction CD are not parallel to each other and are inclined in the opposite directions in the tire width direction WD.

The longitudinal sipe portion 36 is a sipe which extends in the tire circumferential direction CD. In this example, the longitudinal sipe portion 36 has a straight cross-sectional shape and is inclined with respect to the tire circumferential direction CD. The longitudinal sipe portion 36 is a sipe which alternately connects the facing end portions of the lateral sipe portions 34 and 34 adjacent to each other in the tire circumferential direction CD on the right and left sides in the tire circumferential direction CD and connects the end portions having a short distance therebetween in the adjacent lateral sipe portions 34 in both end portions of the lateral sipe portion 34.

Each longitudinal sipe portion 36 includes an extension portion 40 in which only one end portion out of both end portions in the tire circumferential direction CD of each longitudinal sipe portion 36 extends to one side beyond a connection portion 38 with the lateral sipe portion 34. In this example, each longitudinal sipe portion 36 is provided with the extension portion 40 in which only one end portion on the rear side RR in the rotation direction out of both end portions of each longitudinal sipe portion 36 extends to the rear side RR beyond the connection portion 38 with the lateral sipe portion 34 and is terminated. Here, the rear side RR in the rotation direction indicates an opposite direction with respect to the rotation direction R. In this way, each of the longitudinal sipe portions 36 alternately disposed on the right and left sides is formed so that an end portion on the rear side RR in the rotation direction protrudes to the rear side RR and the protruding portion becomes the extension portion 40.

In a land portion 42 between the pair of adjacent lateral sipe portions 34 and 34, one end side in the tire width direction WD is connected by the longitudinal sipe portion 36 to be formed in a bag-shaped (that is, closed) portion 44 and the other end side thereof is formed in an opening portion 46 opening to the outside WO in the width direction of the zigzag-shaped sipe 32. The extension portion 40 is provided so that the opening width of the opening portion 46 on the stepping side of the land portion 42 (the front side R in the rotation direction) decreases and is not provided on the kicking side of the land portion 42 (the rear side RR in the rotation direction). That is, the kicking side is not provided with the extension portion protruding toward the opening portion 46 from a bent portion 48 obtained by connecting the lateral sipe portion 34 and the longitudinal sipe portion 36 and the opening portion 46 opening to the outside in the tire width direction WD is formed between the kicking side bent portion 48 and the stepping side extension portion 40. Here, the outside WO in the width direction indicates a direction moving away from the center (amplitude center) of the zigzag-shaped sipe 32 in the width direction and is the same as the outside of the tire width direction WD in this example.

The longitudinal sipe portion 36 is inclined to the outside WO in the width direction from the other end portion of the tire circumferential direction CD (the end portion opposite to the one end portion) toward the front end of the extension portion 40. In this example, the longitudinal sipe portion 36 is inclined to the outside WO in the width direction toward the rear side RR in the rotation direction. That is, the longitudinal sipe portion 36 is formed in a shape opening outward.

The zigzag-shaped sipe 32 is provided with a wide portion 52 having a groove width wider than that of a narrow portion 50 which is the other portion. In this example, the wide portion 52 is provided in a part of the lateral sipe portion 34 (specifically, about half the length) and is alternately disposed on the right and left sides in the tire circumferential direction CD. Meanwhile, all of the longitudinal sipe portion 36 is formed as the narrow portion 50.

The groove width of the narrow portion 50 is not particularly limited and may be, for example, 0.1 to 0.6 mm or 0.2 to 0.5 mm. The groove width of the wide portion 52 is not particularly limited as long as the groove width is wider than the groove width of the narrow portion 50 and may be, for example, 0.3 to 1.0 mm or 0.5 to 0.8 mm. Furthermore, the groove depth of the zigzag-shaped sipe 32 is not particularly limited and may be, for example, 30 to 80% of the main groove depth.

As illustrated in FIG. 2, the wavy sipe 28 which extends in the tire width direction WD from each of the apex corner portions 26B of the plurality of notch portions 26 may be terminated while entering the opening portion 46 of the zigzag-shaped sipe 32. Specifically, the leading end portion of the wavy sipe 28 enters the opening portion 46 of the zigzag-shaped sipe 32 and is terminated before reaching the center of the zigzag-shaped sipe 32 in the width direction.

Meanwhile, the straight sipe 30 which extends in the tire width direction WD from each of the inclined edge portions 26C of the plurality of notch portions 26 is provided to be terminated in the vicinity of the bag-shaped portion 44 of the zigzag-shaped sipe 32.

Furthermore, as illustrated in FIG. 2, both side portions of the center land portion 14 in the tire width direction WD respectively include the wavy sipe 28 and the straight sipe 30, and in general, the wavy sipe and the straight sipe are alternately provided in the tire circumferential direction CD. Accordingly, a wavy sipe 54 and a straight sipe 56 not opening to the notch portion 26 are also provided. Then, such a wavy sipe 54 is also terminated while entering the opening portion 46 of the zigzag-shaped sipe 32 similarly to the wavy sipe 28. Further, the straight sipe 56 is also terminated in the vicinity of the bag-shaped portion 44 of the zigzag-shaped sipe 32 similarly to the straight sipe 30.

According to the pneumatic tire of the embodiment with the above-described configuration, since the sipe communicating with the notch portion 26 of the center land portion 14 is formed as the wavy sipe 28, it is possible to compensate deterioration in rigidity by providing the notch portion 26. That is, since the rigidity of the wavy sipe 28 is higher than that of the straight sipe 30, it is possible to suppress deterioration in rigidity while applying an edge effect by the sipe and to obtain a uniform ground contact pressure distribution.

Further, since the sipe provided adjacent to the wavy sipe 28 is formed as the straight sipe 30, it is possible to prevent the rigidity of the portion from becoming too high. Specifically, when the sipe interposed between the wavy sipes 28 and 28 communicating with the notch portion 26 is also formed in a wavy shape, the rigidity of the land portion at that portion becomes too higher than the rigidity of the land portions at the front and rear sides thereof. However, since it is possible to suppress an increase in rigidity by providing the straight sipe 30, it is possible to obtain a uniform ground contact pressure distribution in the tire circumferential direction CD.

In this way, according to the embodiment, since it is possible to obtain a uniform ground contact pressure distribution, it is easy to exhibit performance such as traction performance, uneven wear resistance, or performance on ice.

According to the embodiment, since the center land portion 14 is provided with the zigzag-shaped sipe 32 and the wavy sipe 28 is provided to enter the opening portion 46, the rigidity of the opening portion 46 decreases and hence the ground contact pressure distribution of the portion provided with the zigzag-shaped sipe 32 can be uniform. Specifically, in the zigzag-shaped sipe 32, the rigidity of the opening portion 46 is higher than that of the bag-shaped portion 44 and the ground contact pressure distribution is not uniform. However, when the wavy sipe 28 extends to enter the opening portion 46, it is possible to decrease the rigidity of the opening portion 46 and to decrease a difference in rigidity between the bag-shaped portion 44 and the opening portion 46.

Further, according to the embodiment, since the extension portion 40 is provided in each longitudinal sipe portion 36 of the zigzag-shaped sipe 32, it is possible to improve the edge performance in the lateral direction and to further decrease the rigidity of the opening portion 46 by the extension portion 40. As a result, it is possible to obtain a more uniform ground contact pressure distribution.

Furthermore, in the above-described embodiment, an example in which the notch portion 26, the wavy sipe 28, and the straight sipe 30 are provided in the center land portion 14 has been described, but these members may be provided in the other land portions such as the intermediate land portion 16. Further, the notch portion 26 is not limited to be provided in the main groove and, for example, the same configuration as that of the lateral groove may be employed. Further, the configuration of the intermediate land portion 16 or the shoulder land portion 18 is not limited to one illustrated in FIG. 1 and various configurations can be employed.

Further, in the above-described embodiment, the straight sipe 30 is provided to open to the inclined edge portion 26C of the notch portion 26, but may not open to the notch portion 26. Further, the plurality of straight sipes 30 may open to each inclined edge portion 26C.

Further, in the above-described embodiment, the lateral sipe portion 34 and the longitudinal sipe portion 36 of the zigzag-shaped sipe 32 are formed in a straight cross-sectional shape, but may be formed in a curved cross-sectional shape or a combination thereof. That is, the shape is not particularly limited. Further, in the above-described embodiment, an example in which the zigzag-shaped sipe 32 is continuous while not being interrupted in the tire circumferential direction CD has been described, but the zigzag-shaped sipe may include one or plural divided portions.

Furthermore, the dimensions in the specification are those in a normal state without any load in a state in which a pneumatic tire is mounted on a regular rim and is filled with a normal internal pressure. The regular rim is "Standard Rim" in the JATMA standard, "Design Rim" in the TRA standard, or "Measuring Rim" in the ETRTO standard. The normal internal pressure is "MAXMIMUM AIR PRESSURE" in the JATMA standard, the "maximum value" described in "TIRE LOAD LIMITS AT VARIOUS COLD INFLATION PRESSURES" in the TRA standard, or "INFLATION PRESSURE" in the ETRTO standard.

As the pneumatic tire according to the embodiment, tires for various vehicles such as a tire for a passenger car and a heavy duty tire for a truck, a bus, or a light truck (for example, a SUV car and a pickup truck) can be exemplified. Further, the application of the pneumatic tire is not particularly limited and the pneumatic tire may be used as all season tires and winter tires.

Although several embodiments have been described above, these embodiments have been suggested as an example and are not intended to limit the scope of the invention. These embodiments can be implemented in various other forms and can be implemented while being omitted, replaced, or changed in various ways without departing from the gist of the invention. These embodiments and modifications thereof are included in the scope and gist of the invention as well as in the scope of the invention described in the claims and their equivalents.

What is claimed is:

1. A pneumatic tire comprising:
   a land portion which is formed in a tread portion;
   a plurality of notch portions where each is provided in an edge portion of the land portion and is formed in a triangular shape in the plan view;
   a plurality of wavy sipes wherein a wavy sipe of the plurality of wavy sipes extends from an apex corner portion of a notch portion of the plurality of notch portions into the land portion;
   a plurality of straight sipes which are each provided adjacent to each of the plurality of wavy sipes with a gap interposed therebetween to extend into the land portion
   wherein a straight sipe of the plurality of straight sipes opens to the edge portion of the land portion, and a straight sipe of the plurality of straight sipes is provided to open to an inclined edge portion of each of the plurality of notch portions, and
   the land portion is a rib which extends in a tire circumferential direction, the plurality of the notch portions are provided to be arranged in the edge portion extending in the tire circumferential direction of the land portion, a zigzag-shaped sipe is provided in the land portion to extend in the tire circumferential direction while alternately swinging to the right and left sides of a tire width direction, and the wavy sipe extending in the tire width direction from the apex corner portion of the notch portion is terminated while entering an opening portion opening to the outside of the width direction of the zigzag-shaped sipe.

2. The pneumatic tire according to claim 1,
   wherein the plurality of wavy sipes and the plurality of straight sipes are alternately provided.

* * * * *